UNITED STATES PATENT OFFICE.

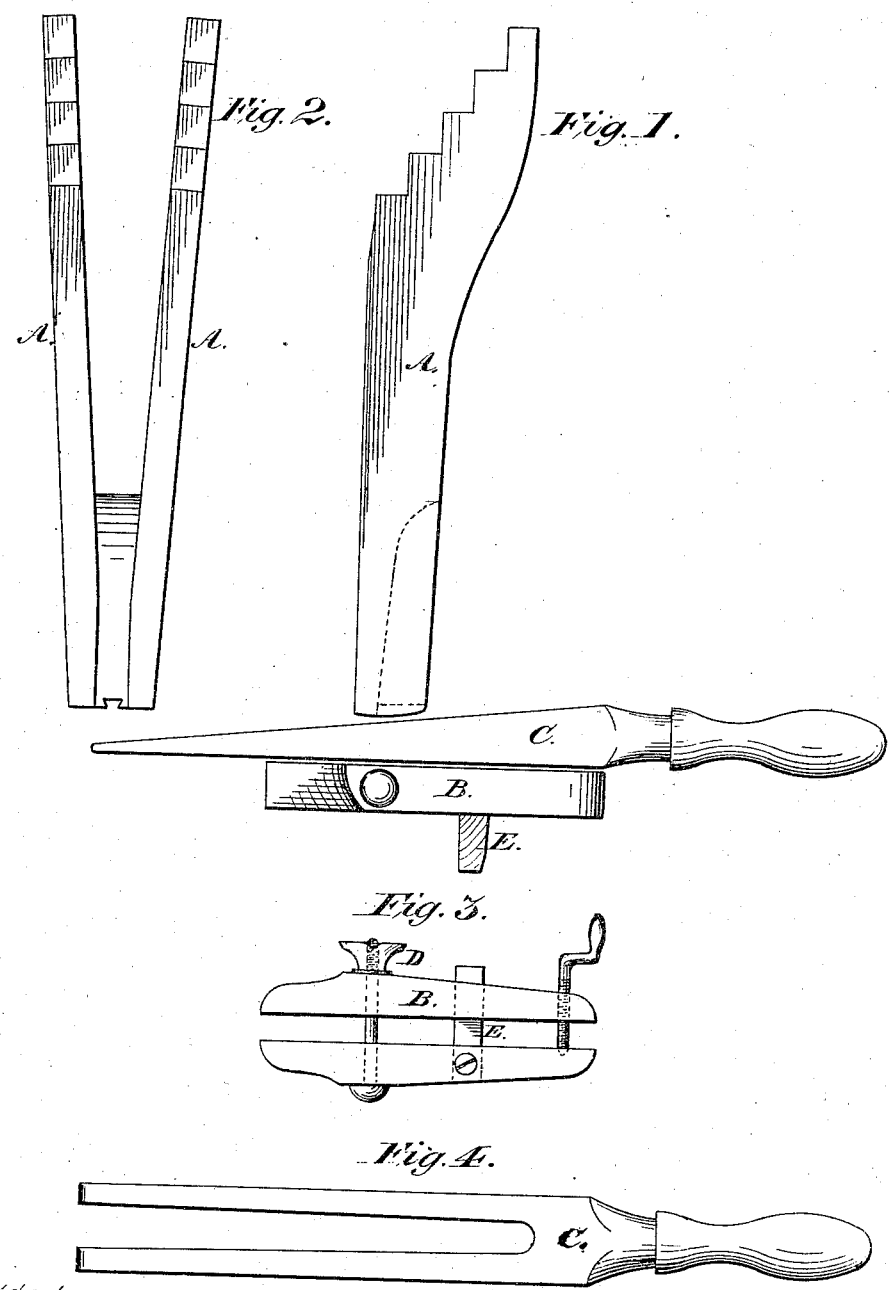

WILLIAM R. SWARTHOUT, OF PENN YAN, NEW YORK.

IMPROVEMENT IN TIRE-TIGHTENERS.

Specification forming part of Letters Patent No. 168,806, dated October 11, 1875; application filed September 22, 1875.

*To all whom it may concern:*

Be it known that I, WILLIAM R. SWARTHOUT, of Penn Yan, in the county of Yates and State of New York, have invented a Tire-Tightener, of which the following is a specification:

The object of my invention is to tighten the tire on a wagon-wheel by raising the felly from the shoulder of the spokes, and placing a washer upon the tenon of the spoke; also, when the felly is opened at the joints, by raising it from the shoulder of the spokes, a piece of leather or other substance may be placed in the opening, thus expanding the felly to hold the tire tight, while the felly is raised sufficiently from the shoulders and kept there by the washer; all of which may be done without loosening the spoke in the hub, as shown in the accompanying drawing, in which—

Figure 1 is a side view, showing the relative position of the several parts. Fig. 2 is a vertical view of the prop, Fig. 3 the clasp, and Fig. 4 the forked wedge.

A is the prop that raises the felly. It is made in two similar parts fastened together, as shown in Fig. 2. The upper end is made with a series of notches, as represented in Fig. 1. These notches may be made to suit the forward and hind wheels of one wagon only, or, with more notches, so as to suit various sized wheels. The lower ends of the prop are fastened together with a wedge-shaped piece between them, which is narrower than the prop, leaving a space between the parts, so that each part will pass by the sides of a spoke and thus be held in position while the wedge C is being driven.

B is the clasp that is applied to the end of the spokes at or near the hub. It is made of two corresponding parts, held together by a bolt, as shown in Fig. 3. The bolt allows it to fit the various sized spokes. It is fastened to the spoke by means of the screw D, or other equivalent device that will force the ends where the screw is apart sufficiently to cause it to clasp the spoke firmly. The end that is applied to the spoke must be beveled so that the clasp may be applied to the spoke near the hub. At the under side of one of the parts a block, E, is fastened. This block is made to fit the outer end of the hub upon which it rests. It must be large enough to keep the clasp nearly level, and prevent it from moving while the wedge C is being driven under the prop A to prevent injury to the paint on the spokes. C is the wedge to be driven between the lower end of the prop A and the clasp B. It is made forked, as represented in Fig. 4, and to correspond in size with the prop and clasp. Its use is to raise the prop sufficiently to raise the felly from the shoulder of the spoke, or raise the felly to open the joint of the felly to admit a piece of leather, or other suitable substance, to be put between its ends.

Having thus fully described my invention, what I claim as new, and desire to secure by Letters Patent, is—

The prop A, clasp B, and wedge C, made substantially as specified and combined, for the purpose set forth.

WILLIAM R. SWARTHOUT.

Witnesses:
JOHN L. LEWIS,
CHARLES KETCHUM.